US006535827B1

United States Patent
Lestina et al.

(10) Patent No.: US 6,535,827 B1
(45) Date of Patent: Mar. 18, 2003

(54) METHOD AND APPARATUS FOR DETECTING AND ISOLATING A RUPTURE IN FLUID DISTRIBUTION SYSTEM

(75) Inventors: Thomas Lestina, Arlington, VA (US); Melissa Bradley, Manchester, CT (US); Ryan Downs, Alexandria, VA (US); Eric Runnerstrom, Falls Church, VA (US)

(73) Assignee: MPR Associates, Inc., Alexandria, VA (US)

(*) Notice: Subject to any disclaimer, the term of this patent is extended or adjusted under 35 U.S.C. 154(b) by 122 days.

(21) Appl. No.: 09/698,484

(22) Filed: Oct. 30, 2000

Related U.S. Application Data

(60) Provisional application No. 60/162,241, filed on Oct. 28, 1999.

(51) Int. Cl.[7] .............................................. G01F 23/00
(52) U.S. Cl. ......................... 702/51; 702/50; 702/100; 137/486; 137/495; 137/624.12
(58) Field of Search ........................... 702/51, 50, 100; 137/498, 67, 312, 613, 68.19, 486, 495, 624.12, 487.5; 73/521

(56) References Cited

U.S. PATENT DOCUMENTS

| | | | |
|---|---|---|---|
| 4,518,955 A | 5/1985 | Meyer | |
| 4,589,435 A | 5/1986 | Aldrich | |
| 4,735,231 A | 4/1988 | Jacquet | |
| 4,816,987 A | 3/1989 | Brooks et al. | |
| 4,873,650 A | 10/1989 | Reeves, Jr. | |
| 5,004,014 A | * 4/1991 | Bender | ........................ 137/486 |
| 5,056,554 A | 10/1991 | White | |
| 5,086,806 A | 2/1992 | Engler et al. | |
| 5,228,469 A | * 7/1993 | Otten et al. | .................. 137/466 |
| 5,333,114 A | 7/1994 | Warrior et al. | |
| 5,333,785 A | 8/1994 | Dodds et al. | |
| 5,431,182 A | 7/1995 | Brown | |
| 5,485,400 A | 1/1996 | Warrior et al. | |
| 5,549,137 A | 8/1996 | Lenz et al. | |
| 5,558,115 A | 9/1996 | Lenz et al. | |
| 5,566,709 A | 10/1996 | Fujii et al. | |
| 5,573,032 A | 11/1996 | Lenz et al. | |
| 5,794,653 A | 8/1998 | DeSmet et al. | |
| 5,825,664 A | 10/1998 | Warrior et al. | |
| 6,089,267 A | * 7/2000 | Gaines | ........................ 137/493 |

\* cited by examiner

*Primary Examiner*—Michael Nghiem
*Assistant Examiner*—Hien Vo

(57) ABSTRACT

Rupture path logic methods of detecting, locating and isolating ruptures within a fluid piping system are disclosed, wherein a rupture within a piping system can be detected and isolated based solely upon local pressure and flow rate measurements at individual valves within the system without the need for communication of measured fluid data between valves at various locations throughout the system. A fluid characteristic is determined individually for each valve based upon the pressure and flow rate measurements at the valve, and that fluid characteristic is compared with set point fluid characteristic information to determine whether each valve is on a fluid path between a fluid supply source and a rupture. Upon detecting a rupture, valves detected as being on such a fluid path are automatically closed within the system in an order of valves furthest from all online fluid supply sources closing first, thereby ensuring eventual isolation of the rupture while allowing intact sections of the piping system to remain open and operational. An automatic rupture detection and isolation fluid piping system is also disclosed that utilizes rupture path logic methods to isolate detected ruptures within the system.

27 Claims, 10 Drawing Sheets

METHOD AND APPARATUS FOR DETECTING AND ISOLATING A RUPTURE IN FLUID DISTRIBUTION SYSTEM

CROSS-REFERENCE TO RELATED APPLICATIONS

This application claims priority from U.S. Provisional Patent Application Serial No. 60/162,241 entitled "Reflexive Valve Logic for Detecting, Locating and Isolating a Rupture in a Fluid Distribution System", filed Oct. 28, 1999. The disclosure of this provisional application is incorporated herein by reference in its entirety.

This invention was made with Government support under contract N00014-97-C-2049 awarded by Naval Research Laboratory. The Government has certain rights in the invention.

BACKGROUND

1. Technical Field

The present invention relates to methods and related apparatus for automatically and effectively isolating ruptures in fluid piping systems without the need for shutdown or manual assistance, thereby allowing such piping systems to continue operating during the detection and isolation of system ruptures.

2. Discussion of the Related Art

Fluid distribution systems often include loop networks and/or branch networks with extended segments of piping or tubing through which flow is controlled using one or more valves. Typically, the valves are actuated by electric, pneumatic or hydraulic actuators which respond to control signals generated from a remote controller. Such fluid control systems frequently distribute cooling fluid through energy generation or energy management systems or are included as part of an automated fire control system as might be found aboard sea vessels.

In particular, shipboard firemain systems must be designed to operate in an automated manner since, at sea, there is seldom the time or manpower which can be brought to bear when considering the many necessary functions associated with operation of a vessel. Military ships must especially be self-sufficient and able to withstand battle damage anticipated during combat.

The U.S. Navy, among others, has been struggling to deal with the serious problems presented by shipboard fires as might be caused by a missile strike. After sustaining battle damage, it is imperative that the fluid handling systems aboard ship be controlled in a manner to isolate any damaged areas thereby preventing continuous flow from fluid supply sources to such damaged areas. Isolation of any ruptures in a reasonable time period also allows the intact portions of the systems to stabilize and restore normal fluid delivery operations through such portions.

Current technology associated with rupture or leak detection in fluid handling systems is based primarily in two areas, the utilization of hydraulic flow balance algorithms to detect fluid loss within a piping system and the utilization of acoustic signal characterization to determine leak conditions. Flow balance techniques utilize flow sensors distributed throughout the piping system to perform fluid mass balance evaluations within selected piping sections. Acoustic signal characterization techniques also distribute sensors throughout a piping system to "listen" for signals that provide an indication of a leak. Both techniques rely on communication between remote sensors and a central processor for identifying and effectively sealing a leak or rupture. Neither technique is practical for rapid and dependable detection of significant leaks or ruptures in the piping in situations where one or more sensors may be damaged and unable to provide detection information to the central processor. As a result, there is insufficient data to allow the processor to effectively isolate a rupture and restore intact portions of the system back to normal operating capabilities.

A more effective technique is needed for detecting and isolating ruptures automatically in fluid piping systems, particularly in systems having damaged sensors in addition to ruptured lines.

OBJECTS AND SUMMARY OF THE INVENTION

An object of the invention is to detect ruptures within a piping system without the need for communication between sensors and/or analysis of sensor data recorded in various remote locations throughout the system. Another object of the invention is to automatically and effectively isolate a detected rupture within a reasonable time period by sealing off the rupture from all fluid supply sources operating within the system thereby restoring a desired pressure and permitting fluid distribution within the non-ruptured sections of the piping system.

A further object of the invention is to provide a piping system having a plurality of valves within the system that are each capable of opening or closing based upon a detected characteristic of fluid in the immediate vicinity of each valve without the need for communicating with other valves or detecting characteristics of the fluid remote from each valve. Yet another object of the invention is to close valves within the system that were detected as being in fluid communication with a ruptured portion of the system in an order such that valves closest to the rupture and furthest from one or more fluid supply sources close first, thereby ensuring that the system is sealed off closest to the rupture while allowing as much of the intact system as possible to remain operational.

In order to meet the foregoing objectives, a method of detecting and isolating ruptures within a fluid piping system is provided, wherein the piping system has at least one fluid supply source and a plurality of open valves. The method includes continuously measuring a fluid characteristic at or near each valve, continuously detecting whether each valve within the piping system is on a rupture path within the piping system based upon a comparison of the measured fluid characteristic at or near each valve with a set point fluid characteristic for each valve, and opening or closing each valve based upon the outcome of the detection. Each valve will close or remain closed if the detection indicates that the valve is on a rupture path, whereas each valve will open or remain open if the detection does not indicate that the valve is on a rupture path. Additionally, under the rupture path logic method, open valves that are detected as being on a rupture path are closed in an order such that valves furthest from one or more fluid supply sources close prior to the closure of all other open valves on a rupture path.

A rupture detection and isolation fluid piping system is also provided including at least one fluid supply source and a plurality of valves. Each valve includes a first pressure sensor at or near the valve inlet, a second pressure sensor at or near the valve outlet, an actuator that automatically opens or closes the valve, and a processor in communication with both pressure sensors and the actuator. Each processor determines whether its respective valve is on a rupture path in the fluid piping system based upon a comparison of a fluid characteristic, obtained from pressure measurements at or near the first and second pressure sensors, with a set point fluid characteristic associated with its respective valve. Additionally, each processor opens or closes its respective valve via the actuator based upon the determination as to whether its respective valve is on a rupture path. A timer provided in each processor is activated upon a determination that its respective valve is on a rupture path thereby recording a rupture time for the valve, and each processor closes its respective valve when a rupture time exceeds a predetermined time delay for the valve. In order to ensure proper closure of the valves (i.e. valves closest to the rupture close before the closure of any other valve), the time delay for each valve is proportional to the distance between each valve and one or more fluid supply sources.

The methods and apparatus of the present invention incorporate valves having processors pre-programmed with rupture path logic steps for sensing and isolating damaged portions of fluid handling systems and restoring intact, undamaged sections to service, without intervention by shipboard personnel. In the methods of the present invention, the rupture is sensed and automatically isolated by cutting off damaged portions using only the information available at each valve. Use of global system information such as pre-damage configuration information from a remote supervisory or master control system preferably enhances system reliability and response time, but is not required for system operation, in the method of the present invention.

Each valve utilized in the invention includes first and second pressure sensors at or near the valve inlet and valve outlet, respectively, to measure a fluid characteristic, such as rupture resistance, in the fluid handling system pipe network. Optionally, each valve may also include a flow rate sensor for measuring the fluid flow rate at or near the valve. A fluid characteristic is determined from either the pressure readings or the pressure and flow rate readings. That fluid characteristic is compared to set point information stored by the processor and specific to each valve, and from such comparison a determination can be made as to whether the valve is on a rupture path. Valves closest to the rupture are closed first, and enough settling time is permitted so that other valves which had also been determined as being on a rupture path would detect any restored integrity to the fluid handling system. The rupture path logic incorporated within each valve therefore allows a valve to "reset" itself when applicable, i.e., to abort a "close valve" command in the logic processing steps if the fluid characteristic at the valve no longer provides an indication that the valve is on a rupture path. Additionally, each valve in the system will continue sensing after a rupture has been detected and isolated. If a second rupture is detected, each valve will continue executing the rupture path logic steps whereupon the valve or valves closest to the rupture will close, thereby restoring the remaining undamaged portion of the fluid handling system to operation. In this way, the fluid system responds to changing circumstances without the need for human intervention.

DESCRIPTION OF THE PREFERRED EMBODIMENTS

The methods and apparatus of the invention are based upon the recognition that fluid characteristics measured at individual valves within a fluid piping system, rather than at remote locations throughout the system, can be highly effective in detecting ruptures within the system. In detecting a rupture within a fluid distribution system, the methods and apparatus of the invention utilize rupture path logic, wherein a determination is made as to whether each valve is on a rupture path. A "rupture path", as used herein, is defined as a fluid flow path existing between one or more fluid supply sources and a rupture within a fluid piping system. The term "fluid supply source", as used herein, simply means any device that supplies fluid to a fluid piping system, including, without limitation, a pump, a fluid tank or a reservoir. A determination is made as to whether a particular valve in the system is on a rupture path by comparing a fluid characteristic measured at the valve with a set point fluid characteristic for the valve. The term "fluid characteristic", as used herein, is defined as one or more values that are based upon the downstream pressure and flow rate at a valve and that provide an indication of whether the valve is on a rupture path. The measured fluid characteristic can in fact be the downstream pressure and flow rate or at least one value that is dependent upon such pressure and flow rate values.

If a valve is on a rupture path after the occurrence of a rupture within a system, the downstream pressure will decrease below a desired set point value for the valve, and the flowrate will increase above a desired set point value. The fluid characteristic at the valve, which is a function of downstream pressure and flow rate, will provide an indication as to whether a rupture has occurred in the system and whether the valve is on a rupture path leading to that rupture. A rupture resistance is an effective fluid characteristic value for detecting a rupture. The rupture resistance is defined by the following equation:

$$R = P_d/Q^2 \qquad (1)$$

where

R=rupture resistance, psi/gpm$^2$ (Pa/lpm$^2$);

$P_d$=downstream pressure, psig (Pa); and

Q=flow rate, gpm (lpm)

The downstream pressure at a valve is the pressure measured at the valve outlet. It is noted that the outlet of the valve may change depending on fluid flow directional changes in the system (e.g. due to a rupture formation and/or fluid supply sources going online or offline) or if the valve is closed. As discussed in greater detail below, the rupture path logic methods and apparatus utilized in the invention account for changing flow directions in a piping system so as to provide an appropriate measurement of downstream pressure at valves within the system.

Figure 1:
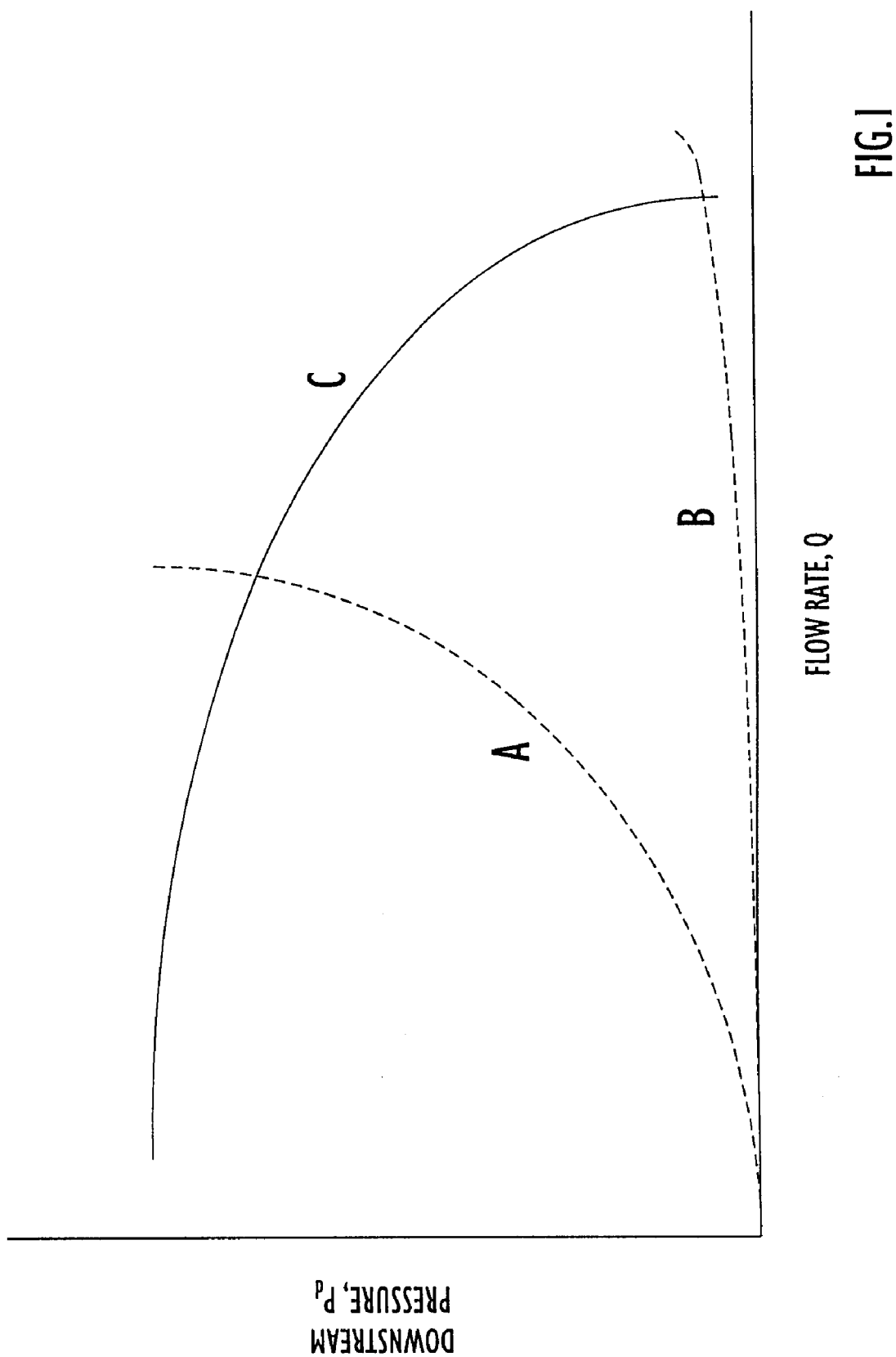
FIG. 1 is a diagram showing the relationship between typical flow rates vs. downstream pressures at a valve under normal conditions and at rupture conditions in the valve flow line.

In FIG. 1, a plot of flow rate, Q, vs. downstream pressure, $P_d$, in the vicinity of a typical valve is displayed to show how the rupture resistance value changes under rupture conditions. When a rupture occurs in the flow path of a valve, a corresponding decrease in downstream pressure and increase in flow rate at the valve results, which also results in a significant decrease in rupture resistance. Such change in fluid characteristics due to a rupture is evident when comparing curve A with curve B in FIG. 1. Curve A represents a rupture resistance curve under normal conditions and curve C represents the system supply. Curve B represents a rupture resistance curve during a rupture condition within the system. The significant deviation of curve B from the normal curve A clearly shows how effective a measurement of rupture resistance can be in rupture detection. In practicing the invention, the flow rate and downstream pressure at a valve could be measured to calculate a rupture resistance value R according to equation (1), and that rupture resistance value would be compared to an absolute set point rupture resistance value, or $R_{rupture}$, to detect whether the valve was on a rupture path. If $R<R_{rupture}$ then the valve would be indicated as being on a rupture path.

Each location and flow direction in a piping system has a unique rupture hydraulic characteristic. Normal rupture resistance curve A and supply curve C of FIG. 1 will change when the alignment of fluid supply sources is changed (e.g. when a pump is started) and when conditions of a fluid supply source changes (e.g. when a tank level changes or a pump degrades). Depending on the hydraulic characteristics of the fluid system and the locations of valves designated for rupture path monitoring, different set point values may be used for different valves to achieve a desired system performance. Therefore, each valve may have its own, specific set point information for comparison to a specific fluid characteristic for that valve.

Other fluid characteristic values based upon pressure and flow rate measurements at the valve have been determined to be effective as a rupture resistance measurement. The following Table 1 provides examples of different fluid characteristics for detecting rupture conditions at a valve. Only one fluid characteristic and corresponding set point fluid characteristic need be utilized for detecting whether a valve is on a rupture path. The selection of a specific fluid characteristic will depend upon the location of the valve in relation to the service demands and fluid supply sources as well as the system hydraulic characteristics.

TABLE 1

| Set Point Fluid Characteristic | Rupture Condition for the Detection of Ruptures |
| --- | --- |
| $R_{rupture}$ | $P_d/Q^2 < R_{rupture}$ |
| $dR_{rupture}$ | $R_{baseline} - (P_d/Q^2) > dR_{rupture}$ |
| $P_{set}$, $Q_{rupture}$ | $P_d < P_{set}$ and $Q > Q_{rupture}$ |
| $P_{set}$, $dQ_{rupture}$ | $P_d < P_{set}$ and $(Q - Q_{baseline}) > dQ_{rupture}$ |
| $dP_{set}$, $dQ_{rupture}$ | $((P_d)_{baseline} - P_d) > dP_{set}$ and $(Q - Q_{baseline}) > Q_{rupture}$ | where $R_{rupture}$ is the absolute rupture resistance set point;

$dR_{rupture}$ is a relative set point for change in rupture resistance from baseline conditions used to detect rupture conditions;

$R_{baseline}$ is the most recent measured rupture resistance under normal (non-fault) conditions;

$P_{set}$ is a low pressure set point established to indicate fault conditions for a closed valve or used as a rupture set point for an open valve;

$dP_{set}$ is a relative set point for change in pressure from baseline conditions used to detect rupture conditions;

$(P_d)_{basline}$ is the most recent measured downstream pressure under normal (non-fault) conditions;

$Q_{rupture}$ is the absolute flow set point used to detect rupture conditions;

$dQ_{rupture}$ is a relative set point for change in flow rate from baseline conditions used to detect rupture conditions; and $Q_{baseline}$ is the most recent measured flowrate under normal (non-fault) conditions.

Each row in Table 1 provides a set point fluid characteristic in the first column, and the second column of each row sets forth a comparison of a corresponding fluid characteristic with the set point fluid characteristic for identifying a rupture condition. For instance, in the fourth row of Table 1, the set point fluid characteristic consists of the values $P_{set}$ and $dQ_{rupture}$, and the fluid characteristic consists of the values $P_d$ and $Q-Q_{baseline}$. A rupture condition is satisfied based upon the comparison of the measured fluid characteristic with the set point fluid characteristic, i.e. when $P_d<P_{set}$ and $(Q-Q_{baseline})>dQ_{rupture}$.

Although the rupture detection conditions set forth in Table 1 are preferred, it is noted that other rupture detection conditions may also be utilized in the practice of the invention. Essentially, any rupture detection condition that is satisfied based upon a downstream pressure at the valve decreasing below a minimum value and flow rate at the valve increasing above a maximum value may provide an appropriate identification that the valve is on a rupture path.

In addition to requiring a flow rate and downstream pressure at a valve to determine whether the valve is on a rupture path, an upstream pressure, $P_u$, is also essential for determining a pressure differential at the valve. During rupture conditions in a piping system, the direction of fluid flow through a particular valve on the rupture path may change prior to isolation of the rupture, e.g., due to the location of the rupture with respect to that particular valve or the closing of other valves prior to closure of that particular valve. By measuring a pressure differential at each valve (i.e. the pressure between the inlet and the outlet of the valve), the direction of flow as well as a downstream pressure can be determined. The direction of flow through a particular valve on a rupture path is also necessary in order to determine an appropriate time delay for closing the valve, an important feature in rupture path logic. Calculation of an appropriate time delay for closure of valves results in valves on the rupture path closest to the rupture closing first, followed by valves on the rupture path furthest from the rupture closing last (if necessary). The closure of valves in this fashion ensures the sealing of the least amount of piping sections surrounding the rupture so as to leave as much of the system intact as possible after rupture isolation. An exemplary method for calculating a time delay under rupture path logic is disclosed in greater detail with regard to FIGS. 3a and 3b.

Each valve in a rupture path logic detection system is preferably equipped with two pressure sensors in order to obtain a pressure differential at the valve. One sensor is located at the valve inlet and the other at the valve outlet. A flow rate sensor, such as a flow meter, may also be placed in the immediate vicinity of the valve. However, the flow rate can be determined without the use of a flow rate sensor, if the valve flow coefficient is known, based upon the following:

$$C_v = Q/\sqrt{(\Delta p)} \qquad (2)$$

where $C_v$ is the valve flow coefficient; and $\Delta P = P_u - P_d$.

In addition to each valve being equipped with sensors for measuring upstream and downstream pressures, the valves are preferably also equipped with a processor for evaluating the fluid characteristic and an actuator, which is controlled by the processor, for opening or closing a respective valve. The addition of a processor to each valve provides the valves with the ability to apply rupture path logic independently, thereby rendering each valve a "smart valve". Each smart valve evaluates its own sensor information to determine a fluid characteristic, compares the measured fluid characteristic with a set point fluid characteristic for that valve, and makes a determination based upon such comparison as to whether it is on a rupture path. Each smart valve is also capable of opening or closing without any communication with the other smart valves or any supervisory or master control system.

Figure 2:
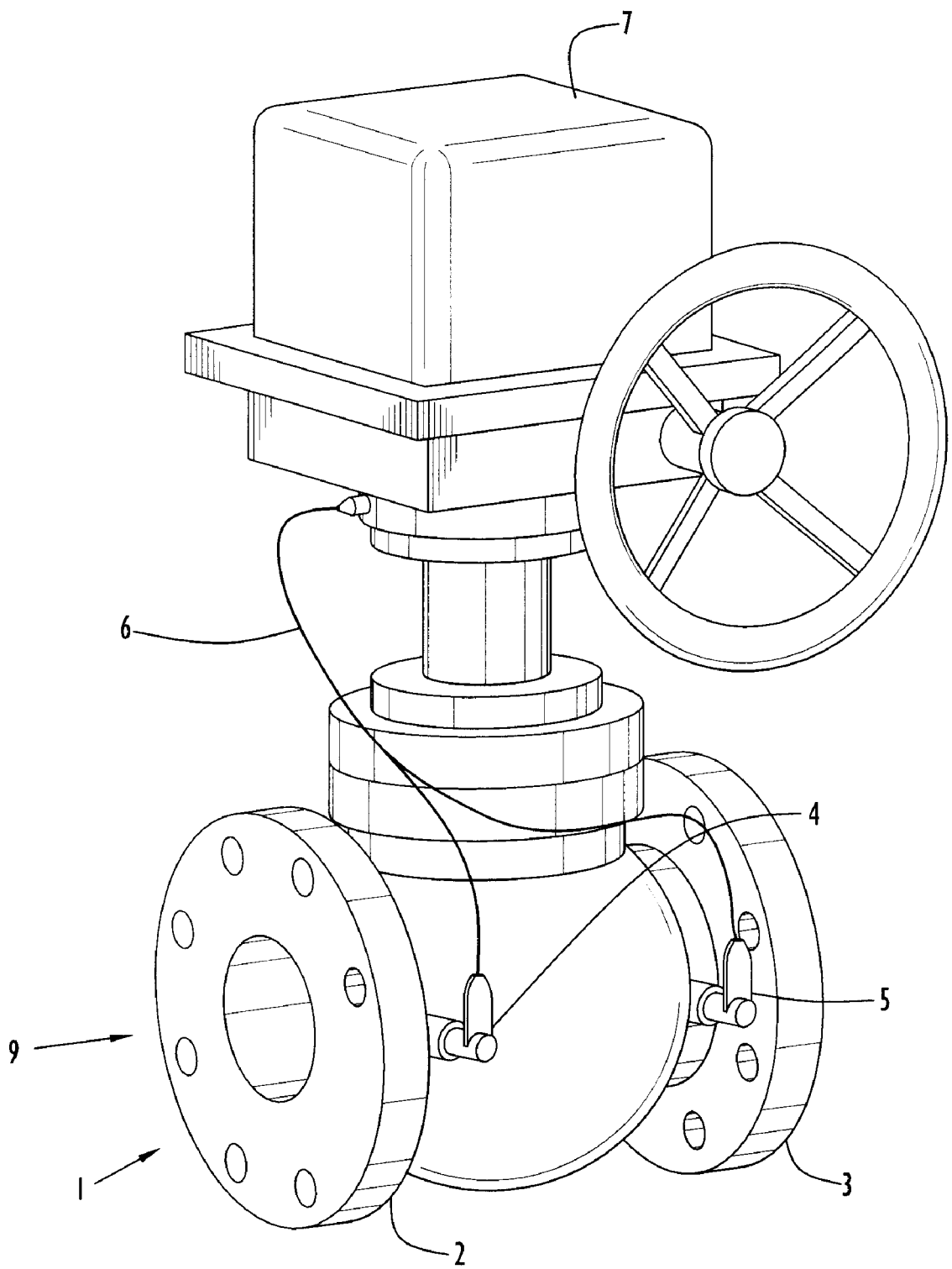
FIG. 2 is a perspective view of a rupture path valve utilized in the invention.

An exemplary embodiment of a smart valve utilized in the invention is shown in FIG. 2. Smart valve 1 has an upstream pressure sensor 4 located at the valve inlet 2 and a downstream pressure sensor 5 located at the valve outlet 3. Arrow 9 represents the direction of fluid flow through the valve. In a situation in which a change in flow direction occurs through valve 1, sensor 5 becomes the upstream pressure sensor and sensor 4 becomes the downstream pressure sensor. Sensor wires 6 lead to a housing 7 that contains a microprocessor, actuator for opening and closing the valve, and a network transceiver. A flow rate sensor (not shown) may also be provided proximate to valve 1 and in communication with the microprocessor.

Signal data transmitted from the pressure sensors to the processor may vary depending upon the placement of each sensor with respect to the valve. For example, changing the radial orientation of a sensor location along the inlet or outlet portion of the valve will modify the signal output from the sensor, which will require a modification in the conversion of such signal into an accurate pressure measurement. Therefore, it is preferable to provide both sensors 4, 5 at the same orientation with respect to one another in relation to the corresponding valve (as shown in FIG. 2).

The microprocessor stores set point fluid characteristic information, e.g. based upon a chosen set point parameter from Table 1, that is compared to a measured fluid characteristic at the valve in order to determine whether the valve should be open or closed. The set point fluid characteristic information may optionally be input from a remote source, such as a remote supervisory or master controller, to the microprocessor. The transceiver also allows the smart valve to communicate with the master controller to receive additional information such as override instructions as well as with fluid supply sources in the system to determine the status of those fluid supply sources (whether they are online or offline) during a particular fluid delivery process.

Rupture path logic methods of the invention generally include evaluating the valve status for each valve, detecting a rupture path within the system, and isolating the rupture path from all operating or online fluid supply sources, such as pumps or reservoirs. The valve status step includes checking the valve position in the piping system and its operating mode (i.e. open or closed). The rupture path detection step includes comparing the fluid characteristic obtained from most recent downstream pressure and flow rate measurements proximate to the valve with the set point fluid characteristic of the valve in order to determine whether the valve is on a rupture path. The rupture path isolation step involves calculating a time delay for closing the valve based upon known information regarding the valve's position in relation to all online fluid supply sources. The time delay is calculated such that open valves that are on a rupture path and furthest from all online fluid supply sources will close before all other open valves on such rupture path, thereby ensuring that only valves closest to the rupture will close and effect an isolation of the rupture. Upon closure of all the valves determined to be on the rupture path, the rupture is isolated from every online fluid supply source, resulting in restored operating pressures and flow rates within the remaining portions of the piping system.

Figure 3A:
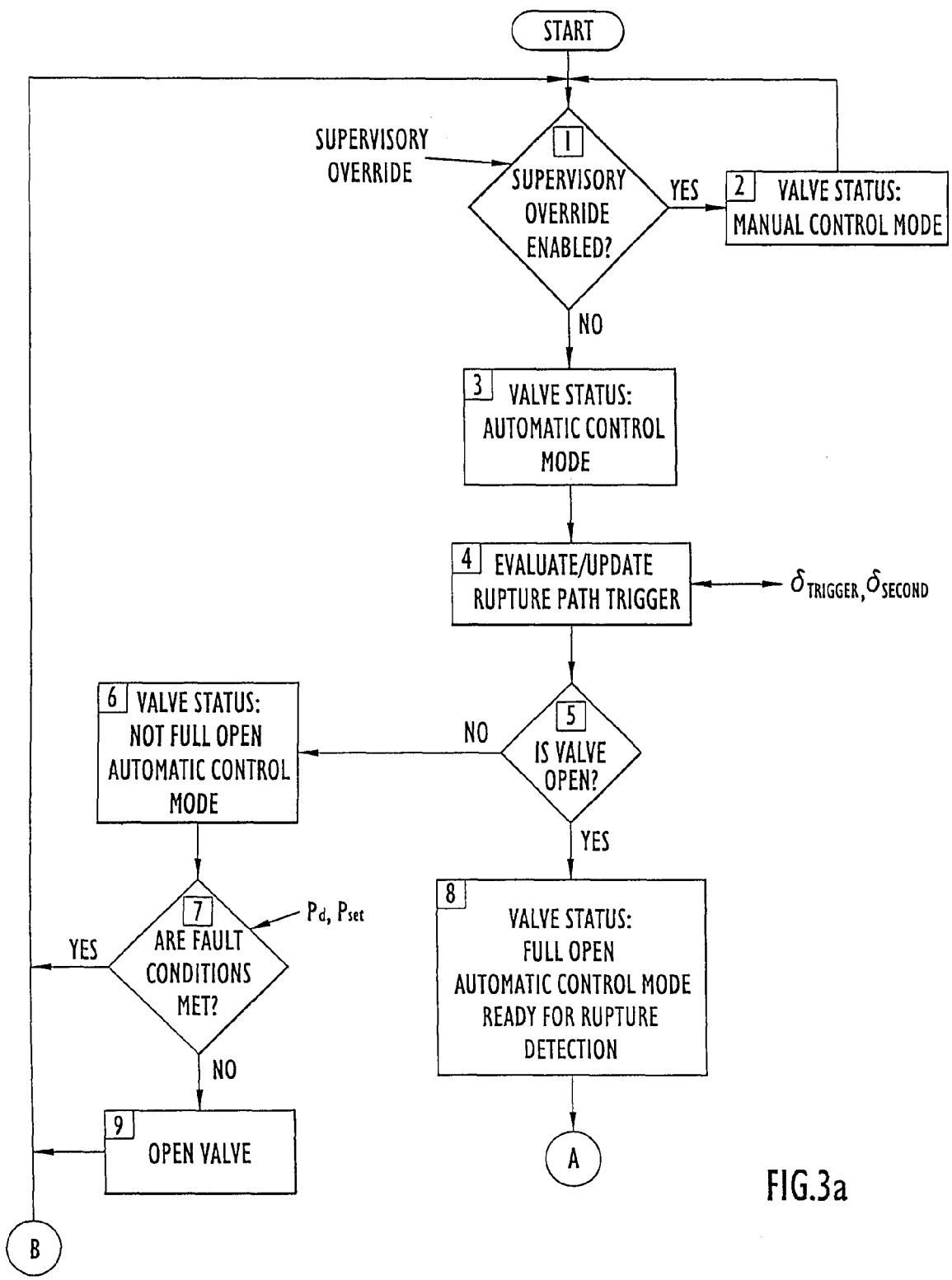
FIGS. 3a and 3b present a flowchart diagram outlining an embodiment of the rupture path logic methods of the invention.
Figure 3B:
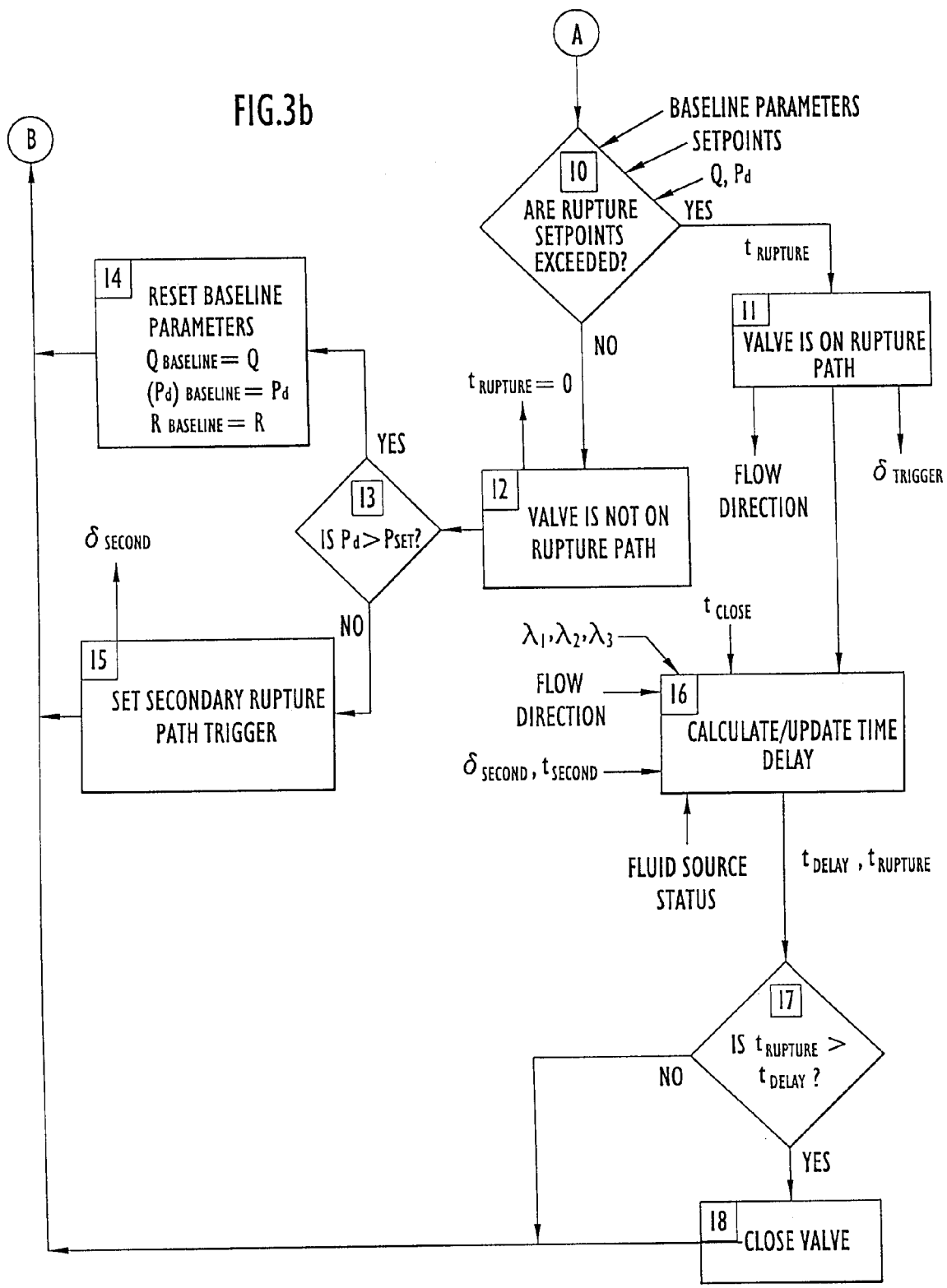

A schematic representation of an exemplary rupture path logic method of the invention is set forth in FIGS. 3a and 3b. This method incorporates a control logic loop incorporating a series of iterative steps. In the exemplary embodiment, the system has a supervisory override mode that switches the valve from a manual control (offline) mode to an automatic control (online) mode. Preferably, such supervisory override mode can be controlled by a remote supervisory or master controller communicating with each smart valve via its transceiver. A status check occurs (step 1) at the beginning of the control logic loop, where the valve determines whether it is in manual or automatic mode. If the valve is in manual control (step 2), the control logic will remain in a status check loop until the valve is switched to automatic control. If the valve is in automatic status, the control logic proceeds forward and a rupture path trigger, identified as $\delta_{trigger}$, is evaluated (step 4).

The rupture path trigger indicates whether the valve is on a rupture path according to an assigned value to $\delta_{trigger}$ of either 0 (not on rupture path) or 1 (on rupture path). The assignment of such value to $\delta_{trigger}$ is explained in further detail below (step 11 in FIG. 3b). If $\delta_{trigger}=0$, indicating that the rupture path trigger has not been tripped, no change is made to $\delta_{trigger}$. If $\delta_{trigger}=1$, indicating that it has been tripped, such value may be re-set to zero based upon an input from the master controller, a detection of increased upstream and downstream pressure at the valve, or if a time delay set point is exceeded that ensures rupture isolation is complete.

An evaluation as to whether the valve is fully open (step 5) is carried out after rupture path trigger evaluation. If the valve is not fully open, it is either closed, partially closed and closing, or partially open and opening, and a determination is made (step 7) as to whether the measured fluid characteristic in the vicinity of the valve, in comparison to certain set point conditions (e.g. as chosen from Table 1), meet fault conditions for the system. Examples of fault conditions include a rupture in the system that has not been isolated and partial or complete system shutdown (e.g. for maintenance). In the exemplary embodiment, if the downstream pressure, $P_d$, is less than a set point pressure, $P_{set}$, or $\delta_{trigger}=1$, then the fault conditions are met and the valve remains closed. If the fault conditions are not met, then the fluid characteristic in the vicinity of the valve is considered normal and the valve is opened or is allowed to continue opening (step 9). Optionally, a reopen time delay may be initiated to ensure that conditions are still normal during the time delay prior to opening the valve. The valve opening step in rupture path logic provides for reopening of piping sections within a system that are intact but had been temporarily shut down during rupture detection and isolation.

Rupture detection is initiated when a fluid characteristic in the immediate vicinity of the smart valve is measured and compared with set point fluid characteristic information (step 10, FIG. 3b). Pressures are measured at the inlet and outlet locations of the smart valve, and a flow direction is determined based upon the pressure differential at the valve. From the pressure differential and a given valve coefficient, a flow rate can be calculated or, alternatively, measured with a flow rate sensor located in proximity to the valve. From the measured downstream pressure $P_d$ and flow rate Q, a rupture condition, such as a rupture resistance, can be calculated for comparison to a set point condition, such as $R_{rupture}$. During normal operating conditions, the rupture resistance is high, system pressures and flow rates are within normal operating ranges, and changes in downstream operating alignments (e.g. starting and stopping system demands) occur within normal operating ranges. A rupture in a flow path in communication with the valve results in system pressures decreasing and flow rates increasing outside of normal operating ranges, which leads to a reduced rupture resistance.

If a rupture condition (selected from Table 1) is satisfied, the valve is indicated as being on a rupture path by changing $\delta_{trigger}$ from 0 to 1 (step 11). Additionally, a timer is initiated recording a time of rupture detection, or $t_{rupture}$. The valve will close if it is still determined as being on a rupture path when $t_{rupture}$ exceeds a predetermined time delay $t_{delay}$. The time delay, which is described in greater detail below (step 16), is calculated based upon a number of factors.

If a rupture condition is not met, the valve is indicated as not being on the rupture path (step 12). Although a rupture may exist somewhere in the system, the local conditions around the valve are still considered within normal operating conditions and closing the valve will not isolate the rupture. If the timer for $t_{rupture}$ was already initiated (e.g. due to an earlier indication that the valve was on a rupture path during a previous iteration of the control logic loop), then $t_{rupture}$ is reset to 0.

For a valve determined as not being on the rupture path, the downstream pressure $P_d$ at the valve is compared with the set point pressure $P_{set}$ for the valve (step 13) to determine whether local conditions are in fact normal. If $P_d$ is greater than $P_{set}$ at the valve, then conditions are still considered normal around the valve and, depending on whether baseline parameters are used as the set point fluid characteristic in determining a rupture condition, those baseline parameters (i.e., $(P_d)_{baseline}$, $Q_{baseline}$ and $R_{baseline}$) are reset to the values of most recent downstream pressure and flow rate measurements (step 14).

If $P_d$ is not greater than $P_{set}$, then conditions are not considered normal at the valve. If such conditions exist, the valve may be indicated as potentially being on a secondary rupture path by setting a secondary rupture path trigger, $\delta_{second}$, from 0 to 1 (step 15). A secondary rupture path results in the diversion of the rupture path between one or more fluid supply sources and the rupture after closure of one or more valves. Such diversion of fluid flow may cause valves that were not initially on the rupture path to wind up on the diverted or secondary rupture path. A modified time delay may be desirable for closing valves on the secondary rupture path so as to prevent the isolation of intact sections within the piping system. The setting of $\delta_{second}$ to 1 for valves indicating a potential secondary rupture path will provide a desirable modification in the time delay calculation for those valves should they ultimately wind up on the rupture path. After secondary rupture path evaluation is complete (i.e., the comparison of $P_d$ to $P_{set}$, steps 13–15), the rupture control logic returns to the beginning of the loop (step 1) for another logic iteration.

For a valve determined as being on a rupture path (step 11), a time delay $t_{delay}$ is calculated to determine when the valve should begin closing (step 16). The time delay is based upon a number of factors including distance of the valve from different online fluid supply sources (e.g. pumps), flow direction through the valve, whether $\delta_{second}$ is set to 1, and other application factors associated with isolation requirements for specific systems. The value of the time delay can be modified after an initial calculation based upon a change in status of the system, such as fluid supply sources going online or offline in the system after a rupture has occurred. While not required, the modification of the time delay based upon status changes in the system can optimize isolation of the rupture.

Calculation of the time delay based upon the foregoing variables ensures that valves closest to the rupture and furthest from online fluid supply sources close first, thereby isolating the rupture while preventing the shutdown of intact sections within the system. An exemplary equation for the calculation of a time delay is as follows:

$$t_{delay} = \text{minimum}[\tau_1, \tau_2, \ldots, \tau_n] \tag{3}$$

In equation (3), $\tau_n$ represents a time delay for the valve associated with an individual online fluid supply source n, and $\tau_n$ is a function of a variety of parameters including fluid flow direction at the valve, the time it takes the valve to close and $\delta_{second}$. The time delay, $t_{delay}$ for the valve is determined as the minimum $\tau_n$ value, or the minimum value of all the calculated time delay values corresponding to each online fluid source that is associated with the valve. An exemplary equation for calculating $\tau_n$ is as follows:

$$\tau_n = \lambda_1 t_{close}(N_{max} - N_{valve}) + \lambda_2 \delta_{second} t_{second} + \lambda_3 \tag{4}$$

where $t_{close}$=input value for the valve closing time; i.e. time elapsed between complete open position to complete closed position of valve;

$t_{second}$=input value for the secondary rupture path time delay;

$N_{max}$=input value for the maximum number of valves that separate any fluid source from the valve of interest;

$N_{valve}$=number of valves that separate the valve of interest from online fluid source n based upon the flow direction and path through the valve of interest; and $\lambda_1$, $\lambda_2$ and $\lambda_3$ are input application factors based upon the particular fluid system, valve/actuator combination and arrangement of valves in the system.

The input values and factors for Equation (4) are input into the processor controlling the smart valve. If the smart valve is capable of communicating with fluid supply sources to determine their status, certain input values may be altered during system operation based upon changes in the system (e.g., if an online fluid supply source becomes disabled due to a rupture event), thereby optimizing the time delay value determination for the smart valve. Even if communication is lost, a rupture will be isolated by one or more valves closest to the rupture provided that no unanticipated fluid supply sources are brought online.

In the $\tau_n$ calculation set forth in Equation (4), the $\lambda_1 t_{close}(N_{max} - N_{valve})$ portion accounts for the relative position of the valve on the rupture path, ensuring that each valve on the rupture path is closed in order of valves furthest from online fluid sources and closest the rupture closing first. The $\lambda_2 \delta_{second} t_{second}$ portion accounts for an additional time delay if the valve was detected as potentially being on a secondary rupture path prior to actually being on the rupture path (i.e., $\delta_{second}$ is set to 1), and the $\lambda_3$ portion adjusts the time delay for system effects such as noise, data acquisition delays and non-synchronized time delays between valves.

After the calculation or updating modification of a time delay for the valve (step 16), the rupture time, $t_{rupture}$, is compared to the time delay, $t_{delay}$, in order to determine whether the actuator should begin (or continue) closing the valve (step 17). The valve will remain open until $t_{rupture}$ is greater than $t_{delay}$, at which point the valve will begin closing (step 18). Upon making the determination as to whether or not to begin (or continue) closing the valve, the rupture control logic method returns to the beginning of the loop (step 1) for another logic iteration.

The rupture path logic method of the invention is effective in the isolation of ruptures in varying piping systems, including systems having a single loop, multiple loops and/or branches from the system. The method requires no communication or information of fluid characteristic data between valves, such that each valve is capable of operating independently from any other valve within the system. Optionally, the valves can communicate with a remote supervisory or master controller and/or fluid supply sources for receiving and updating any input information necessary for determining rupture conditions and time delays.

The following three examples are provided to show a real time application of the exemplary logic control method on varying piping systems containing a plurality of smart valves similar to the valve set forth in FIG. 2.

EXAMPLE 1

Figure 4A:
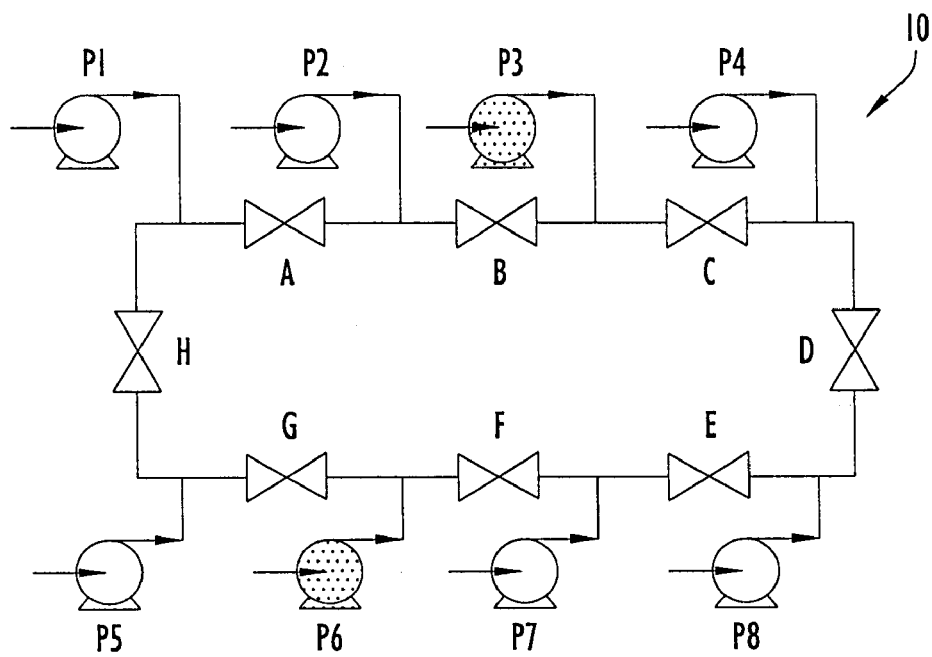
FIGS. 4a–4d present a diagram of a single loop piping system incorporating rupture path logic methods of the invention at different time intervals before and after the occurrence of a rupture within the system.

FIGS. 4a–4d show a single loop piping system 10 at varying times during which a rupture logic control method of the invention is utilized to detect and isolate ruptures within the system. The system 10 includes a plurality of pumps P1–P8 and smart valves A–H all arranged along the piping loop. Valves A–H are all open in FIG. 4a, and pumps P3 and P6 are online (i.e. operating), whereas pumps P1, P2, P4, P5, P7 and P8 are offline (i.e. not operating). Pumps P3 and P6 are marked accordingly in FIGS. 4a–4d to indicate that they are online. FIG. 4a represents a normal operation of the piping system, without any ruptures, and the following set point fluid characteristic and input information is provided to each of the smart valves A–H:

$P_{set}$=50 psig
$dQ_{rupture}$=100 gpm
$t_{close}$=10 seconds
$t_{second}$=30 seconds
$N_{max}$=7
$\lambda_1 = \lambda_2 = 1$
$\lambda_3$=5 seconds The set point fluid characteristic information utilized by the smart valves include the values $P_{set}$, and $dQ_{rupture}$, such that when a downstream pressure at a smart valve drops below 50 psig and the flow rate increases by more than 100 gpm over the baseline value, a rupture is indicated (see Table 1). The third set point fluid characteristic value, $Q_{baseline}$, will be the initial measured flow rate during normal system operation and may change based upon changes in flow rate at the valve that are within normal operating ranges.

Figure 4B:
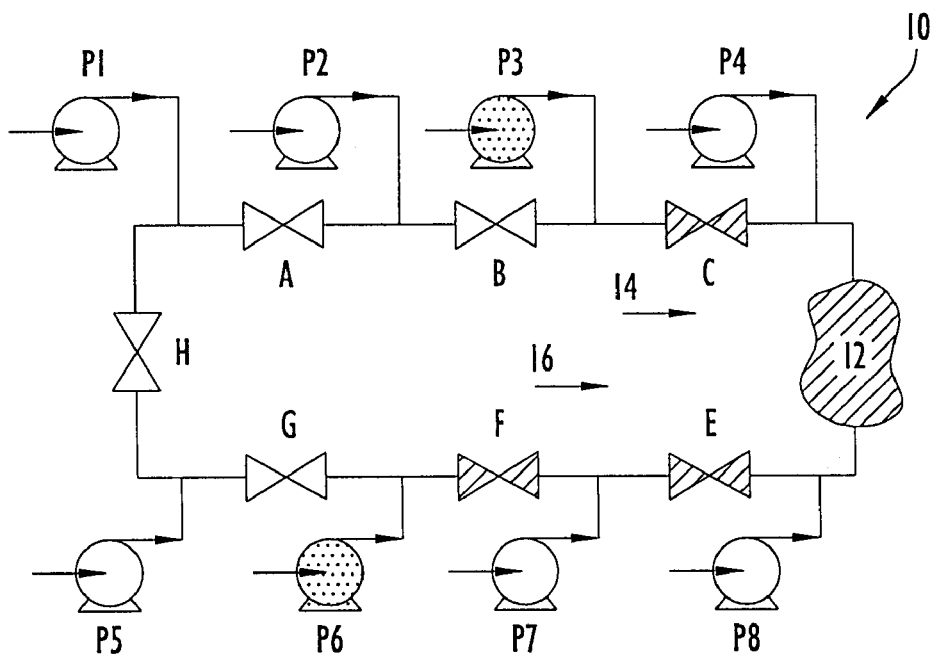

FIG. 4b represents the system at a point in time during its operation in which a rupture 12 suddenly occurs in a piping line at valve D. As a result of rupture 12, the pressure in the loop decreases below the pressure set point (i.e. $P_d < P_{set}$) and the flow rate Q increases to such a degree at valves C, E and F that $Q-Q_{baseline}$ at those valves is greater than $dQ_{rupture}$. Such fluid characteristic measurement at valves C, E and F provide an indication that those valves are on a rupture path. Those valves are marked accordingly in FIG. 4b to indicate their fluid characteristic data satisfy a rupture condition. Arrows 14 and 16 show the fluid flow direction through valve C and valves E and F, respectively. Such fluid flow direction is obtained by a differential pressure measurement ($P_u - P_d$) at each valve. Based upon the determined fluid flow direction, a valve location, $N_{valve}$, for each of valves C, E and F with respect to each of pumps P3 and P6 can be determined. $N_{valve}$ is determined by counting the least number of valves in a piping section of the system that are between the valve of interest and the online fluid supply source. The direction for counting valves between the valve of interest and the online fluid supply source is opposite the direction of flow through the valve. For example, the flow direction with respect to valve C in FIG. 4b is right (i.e. directly towards rupture 12). Therefore, there are zero valves between valve C and pump P3. The valve locations for valves C, E and F with respect to pumps P3 and P6 are set forth in Table 2:

TABLE 2

| Valve | Flow Direction | $N_{valve}$ for Pump P3 | $N_{valve}$ for Pump P6 |
|---|---|---|---|
| C | Right | 0 | 4 |
| E | Right | 5 | 1 |
| F | Right | 4 | 0 |

Upon determining that valves C, E and F are on a rupture path, $\delta_{trigger}$ is set to 1 and a timer is initiated to record a rupture detection time, or $t_{rupture}$, for each of those valves. A time delay, or $t_{delay}$, is also calculated for each of those valves based upon Equations (3) and (4). Table 3 sets forth a calculated time delay, or $\tau_n$, for closure of a valve on a rupture path, where such valve has not been previously indicated as being on a secondary rupture path (i.e. $\delta_{second}$= 0), based upon the given input information and the different possible valve locations:

TABLE 3

| $N_{valve}$ | $\tau_n$ (seconds) |
|---|---|
| 7 | 5 |
| 6 | 15 |
| 5 | 25 |
| 4 | 35 |
| 3 | 45 |
| 2 | 55 |
| 1 | 65 |
| 0 | 75 |

Based upon the information provided in Tables 2 and 3, valve E will be the first to close in response to a rupture condition being satisfied as it has the lowest calculated time delay of $t_{delay}$=25 seconds. The calculated time delay for both valves C and F is 35 seconds. Assuming pressure and flow rate conditions remain the same for both valves when $t_{rupture}$ exceeds 35 seconds, those valves will both close at that time.

Valves A, B, G and H sense a low pressure (i.e., $P_d < P_{set}$) in the system depicted in FIG. 4b, but the flow rate also decreases (i.e., $Q-Q_{baseline} < dQ_{rupture}$) and therefore the rupture condition for those valves is not satisfied. However, the secondary rupture path trigger is tripped (i.e. $\delta_{second}$ is set to 1) indicating that those valves may be on the rupture path after partial isolation of rupture 12 caused by the closing of valve E.

Figure 4C:
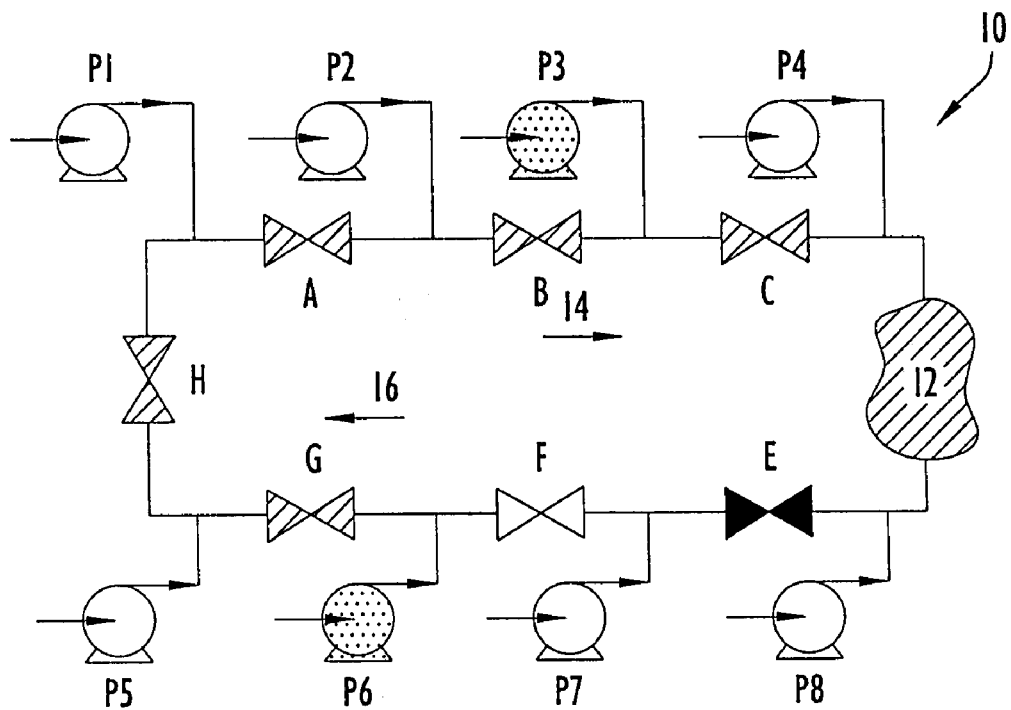

FIG. 4c represents the system immediately after valve E has been closed. Valve E is shaded in the figure to indicate that it is closed. Flow direction 14 remains the same, that is to the right in FIG. 4c. However, flow direction 16 changes direction after the closing of valve E, thereby diverting the rupture path.

The closing of valve E results in a decrease in flow rate at valve F, indicating that valve F is no longer on the rupture path. Therefore, $t_{rupture}$ and $\delta_{trigger}$ are both reset to zero for valve F and fluid flow characteristics are now considered to be in normal operating condition in the vicinity of valve F. Valve C still senses a rupture condition, such that it is still set to close at 35 seconds after initial rupture detection (10 seconds after the beginning of closure of valve E).

Valves A, B, G and H sense an increased flow rate after closure of valve E, such that $Q-Q_{baseline}>dQ_{rupture}$. Since their downstream pressures are still less than their set point pressures, those valves are now indicated as being on the rupture path, which has been diverted due to the closure of valve E. Their rupture path triggers, $\delta_{trigger}$, are set to 1, and they are marked accordingly in FIG. 4c to indicate that they are on the rupture path. Additionally, the $t_{rupture}$ timer is initiated for valves A, B, G and H upon the rupture condition being satisfied for those valves. The valve locations for valves A, B, G and H are shown in Table 4:

TABLE 4

| Valve | Flow Direction | $N_{valve}$ for Pump P3 | $N_{valve}$ for Pump P6 |
|---|---|---|---|
| A | Right | 6 | 2 |
| B | Right | 7 | 3 |
| G | Left | 4 | 0 |
| H | Up | 5 | 1 |

A time delay, $\tau_n$, is also calculated for initiating closure of those valves. Since $\delta_{second}=1$ for valves A, B, G and H, the time delays for those valves will be different than the $\tau_n$ values set forth in Table 3 for valves C, E and F. Table 5 provides $\tau_n$ values based upon various valve locations for valves having $\delta_{second}$ set to 1:

TABLE 5

| $N_{valve}$ | $\tau_n$ (seconds) |
|---|---|
| 7 | 35 |
| 6 | 45 |
| 5 | 55 |
| 4 | 65 |
| 3 | 75 |
| 2 | 85 |
| 1 | 95 |
| 0 | 105 |

Valve B would be the first valve to close of valves A, B, G and H, and it would close 35 seconds after detection of the diverted rupture path, presuming a rupture condition was still detected at valve B at such time.

Figure 4D:
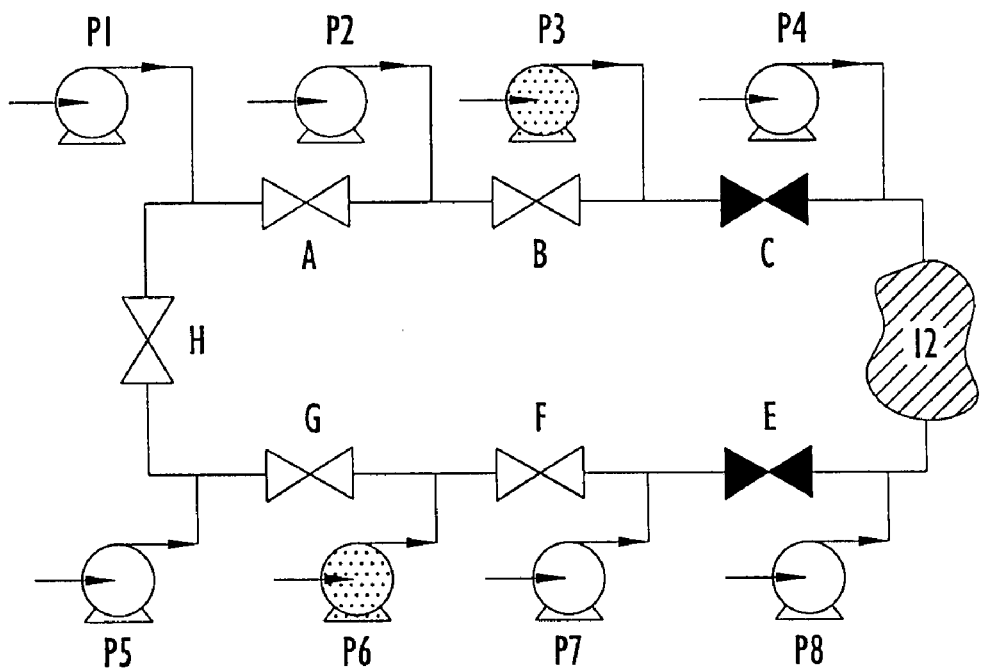

FIG. 4d is a representation of piping system 10 at a time when closure of valve C is complete. Both valves C and E are shaded to indicate their closure. Upon closure of valve C, the pressure at valves A, B, G and H increase above set point and the flow rate decreases below set point, such that a rupture condition is no longer indicated and fluid flow characteristics are considered normal at those valves. The rupture path triggers, $\delta_{trigger}$ and $\delta_{second}$, and $t_{rupture}$ for each of those valves are accordingly reset to zero. As indicated in FIG. 4d, rupture 12 is now effectively isolated by valves closest to the rupture, leaving as much of the intact piping sections as possible to continue functioning under normal conditions.

EXAMPLE 2

Figure 5A:
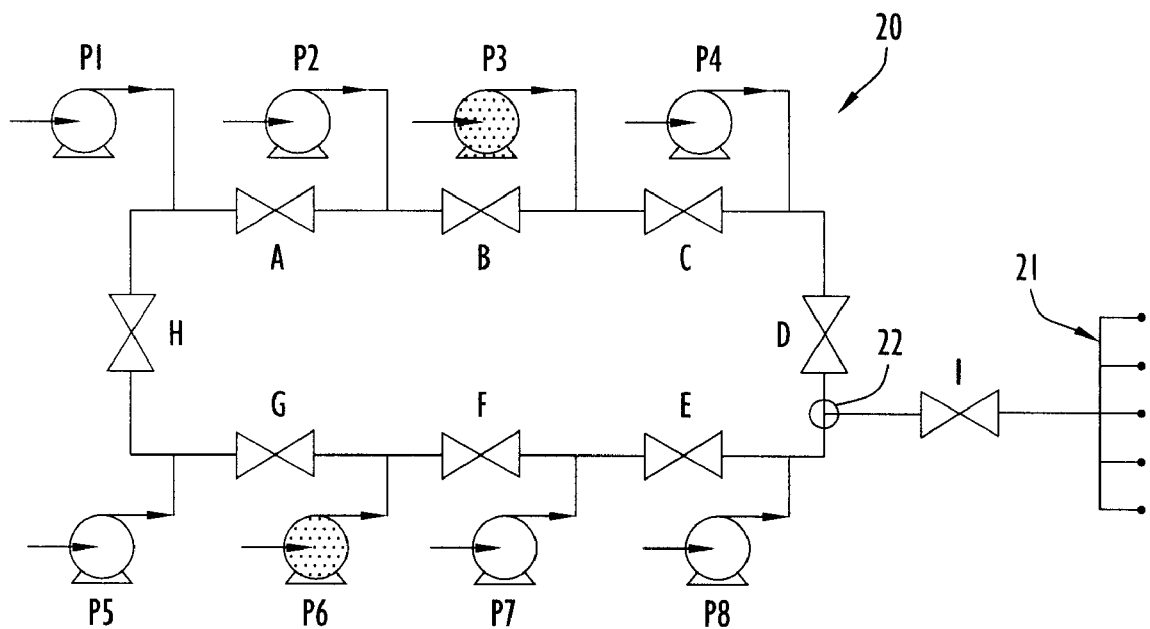
FIGS. 5a–5c present a diagram of single loop piping system having branched lines and incorporating rupture path logic methods of the invention at different time intervals before and after the occurrence of a rupture within the system.
Figure 5B:
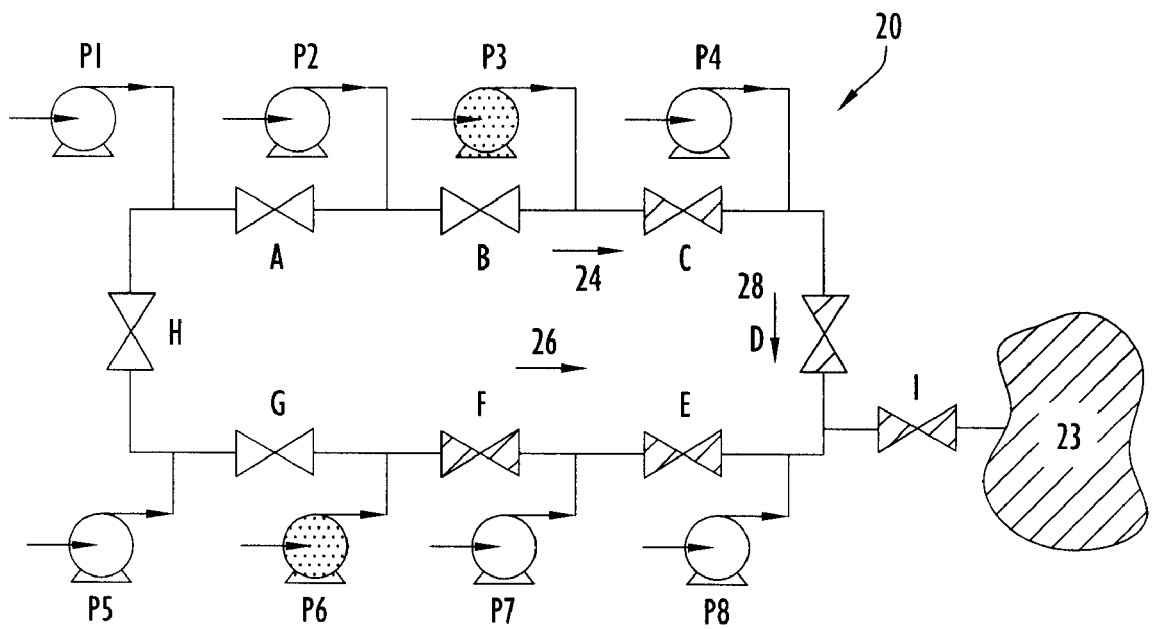
Figure 5C:
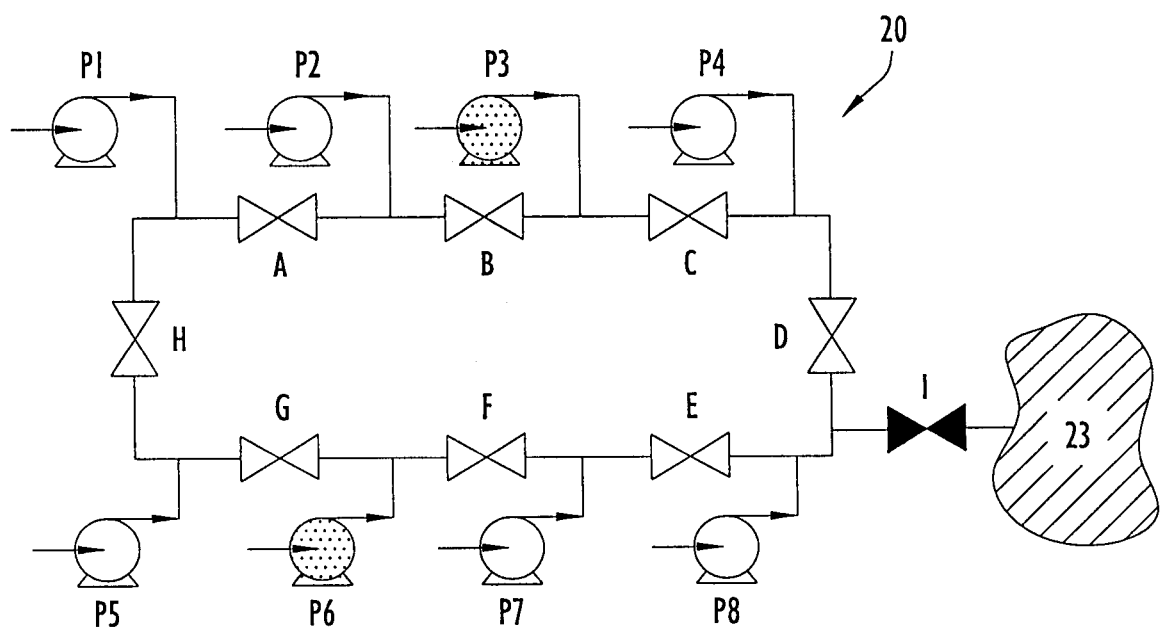

FIGS. 5a–5c depict a looping piping system 20 having the same A–F smart valve and P1–P8 pump configuration as depicted in FIGS. 4a–4d, with an additional line branching from the loop including smart valve I. All of the smart valves are open in FIG. 5a, and pumps P3 and P6 are the only pumps online (marked accordingly in FIGS. 5a–5c to show online status). Downstream from valve I is a branching network of pipes 21 that deliver fluid to selected areas throughout a structure that houses piping system 20.

The input information for valves A–H is the same as that which is set forth in Example 1. Valve I utilizes the same input information with the exception of the $N_{ma}$, value. The pressurized fluid supply source for valve I and the branch line it is on is at the branch pipe connection to the main line or loop supplying fluid to the branch line. For valve I, the single fluid supply source is at the T-branch location designated as 22 in FIG. 5a, such that $N_{max}=N_{valve}=0$ for valve I. FIG. 5a shows the system operating under normal conditions.

When a rupture 23 occurs at branching network 21, as indicated in FIG. 5b, the pressure in the loop of the piping system drops below the set point of 50 psig. The flow rate at valves C, D, E, F and I also increases by more than 100 gpm, which exceeds the set point $dQ_{rupture}$, such that a rupture condition is detected at those valves and their corresponding $\delta_{trigger}$ and $t_{rupture}$ values are triggered (i.e., $\delta_{trigger}$ is set to 1 and the $t_{rupture}$ timer is initiated). Those valves are marked accordingly in FIG. 5b to indicate that they are on a rupture path. Valves A, B, G and H do not have an increase in flow rate above set point, but the decrease in pressure causes a triggering of their $\delta_{second}$ values (i.e., $\delta_{second}$ is set to 1).

Flow directions 24, 26 and 28 show the direction of flow within the loop and are indicated as right, right and down, respectively, in relation to their depiction in FIG. 5b. Based upon such flow directions through valves C, D, E and F, the valve location for each of those valves with respect to each online pump is set forth in Table 6, and closure time delays based upon valve locations are set forth in Table 7:

TABLE 6

| Valve | Flow Direction | $N_{valve}$ for Pump P3 | $N_{valve}$ for Pump P6 |
|---|---|---|---|
| C | Right | 0 | 4 |
| D | Down | 1 | 5 |
| E | Right | 5 | 1 |
| F | Right | 4 | 0 |

TABLE 7

| $N_{valve}$ | $\tau_n$ (seconds) |
|---|---|
| 7 | 5 |
| 6 | 15 |

TABLE 7-continued

| $N_{valve}$ | $\tau_n$ (seconds) |
|---|---|
| 5 | 25 |
| 4 | 35 |
| 3 | 45 |
| 2 | 55 |
| 1 | 65 |
| 0 | 75 |

As previously noted, $N_{max}=N_{valve}=0$ for valve I in system 20. Utilizing the time delay equations (3) and (4) and the provided input information, valve I will close first at 5 seconds after rupture detection. Valves D and E would be next to close at 25 seconds after rupture detection, presuming a rupture condition was still detected at such time.

Upon closure of valve I (see FIG. 5c, valve I is shaded to indicate closure), rupture 23 is isolated, pressure within the loop is restored to above set point and the flow rates through each of valves C, D, E and F returns to normal. Those valves no longer sense a rupture condition, and their corresponding $\delta_{trigger}$ and $t_{rupture}$ values are reset to zero. Additionally, valves A, B, G and H no longer sense a potential secondary rupture path, and their $\delta_{second}$ values are reset to zero. The piping system 20 is now returned to normal operating conditions.

EXAMPLE 3

Figure 6A:
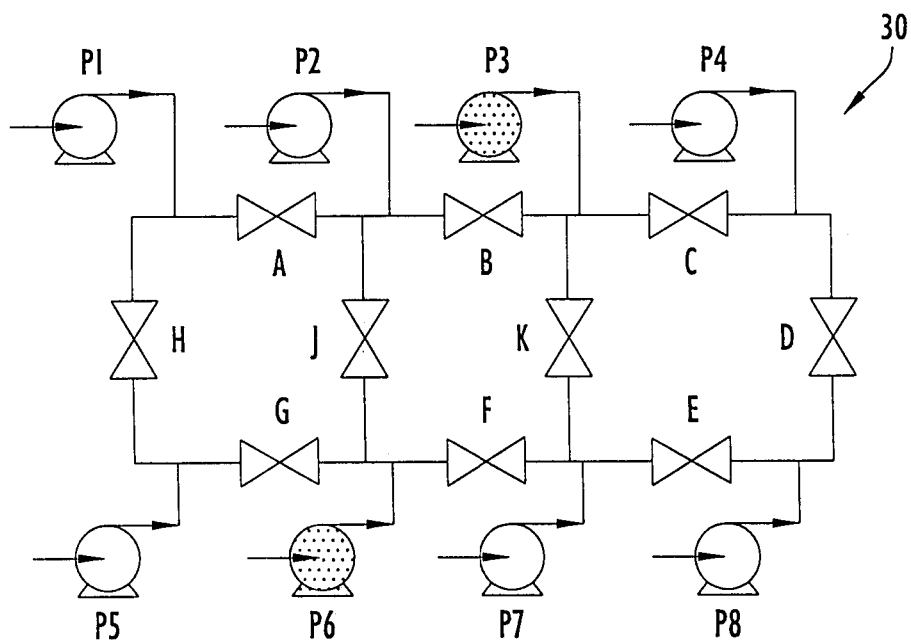
FIGS. 6a–6e present a diagram of a multiple loop piping system having cross connects and incorporating rupture path logic methods of the invention at different time intervals before and after the occurrence of a rupture within the system.

FIGS. 6a–6e depict a piping system 30 having the same A–H smart valve and P1–P8 pump configuration as the system in FIGS. 4a–4d. System 30 also has two cross connecting portions, wherein one cross connecting portion includes valve J and the other cross connecting portion includes valve K, resulting in multiple loops within the system. The input information for the smart valves is the same as that which is set forth in Example 1, with the exception of the $N_{max}$ value. A system having multiple cross connects will result in several different options available for a determining valve locations. In this example, the lowest number of valves separating a pump from a valve was selected as the convention. Utilizing this numbering convention, the highest possible valve location number is 4 (i.e., $N_{max}=4$). FIG. 6a represents system 30 operating under normal conditions in which all valves are open and pumps P3 and P6 are online (marked accordingly to show their online status).

Figure 6B:
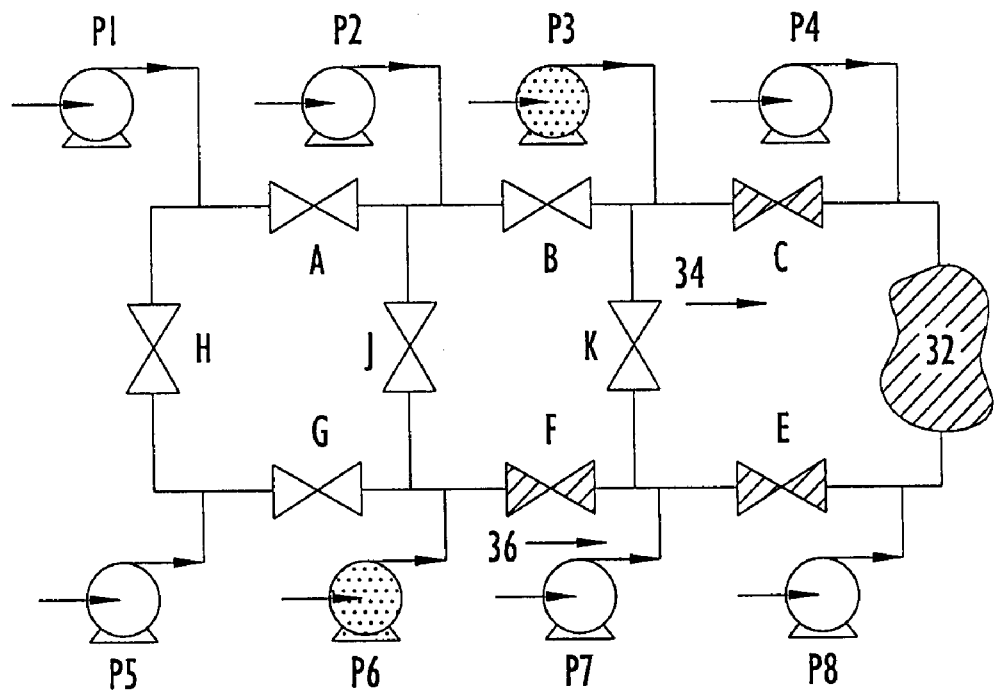

FIG. 6b represents system 30 having a rupture 32 occurring at valve D, resulting in a pressure drop below set point ($P_d<P_{set}$) at all of the valves and an increase in flow rate above the set point ($Q-Q_{baseline}>dQ_{rupture}$) at valves C, E and F. A rupture condition is detected at valves C, E and F (those valves are marked accordingly in FIG. 6b to show they indicate a rupture condition), and their corresponding $\delta_{trigger}$ values are set to 1 and $t_{rupture}$ timers are initiated. A potential secondary rupture path is detected for valves A, B, G, H, J and K, and their $\delta_{second}$ values are set to 1. Flow directions are indicated at 34 and 36 in FIG. 6b, and the resulting valve locations ($N_{valve}$) for valves C, E and F as well as all possible $\tau_n$ closure times are set forth in Tables 8 and 9:

TABLE 8

| Valve | Flow Direction | $N_{valve}$ for Pump P3 | $N_{valve}$ for Pump P6 |
|---|---|---|---|
| C | Right | 0 | 2 |
| E | Right | 1 | 1 |
| F | Right | 2 | 0 |

TABLE 9

| $N_{valve}$ | $\tau_n$ (seconds) |
|---|---|
| 4 | 5 |
| 3 | 15 |
| 2 | 25 |
| 1 | 35 |
| 0 | 45 |

As indicated in Tables 8 and 9, valves C and F will close first at 25 seconds after rupture 32 is detected. Valve E will close at 35 seconds, presuming a rupture condition is still present at such time.

Figure 6C:
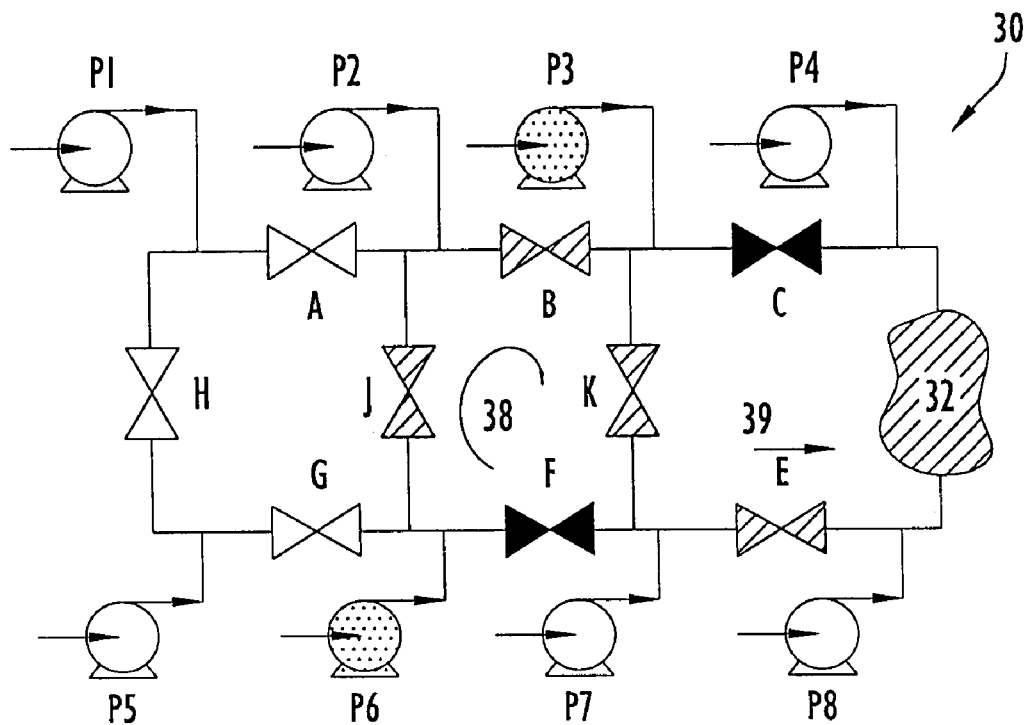
Figure 6D:
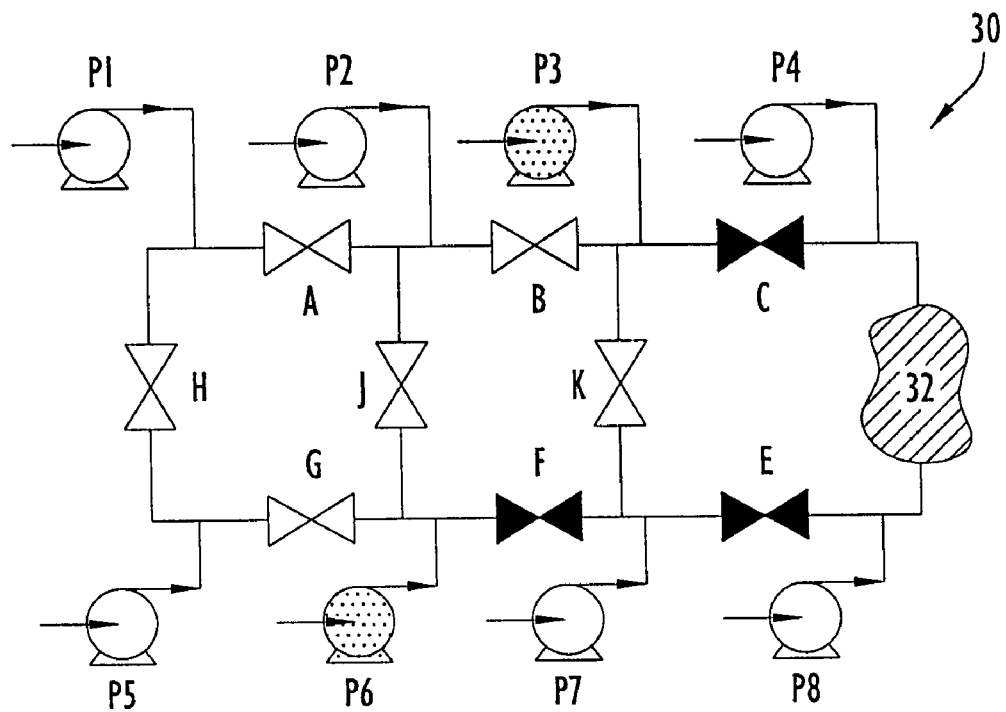
Figure 6E:
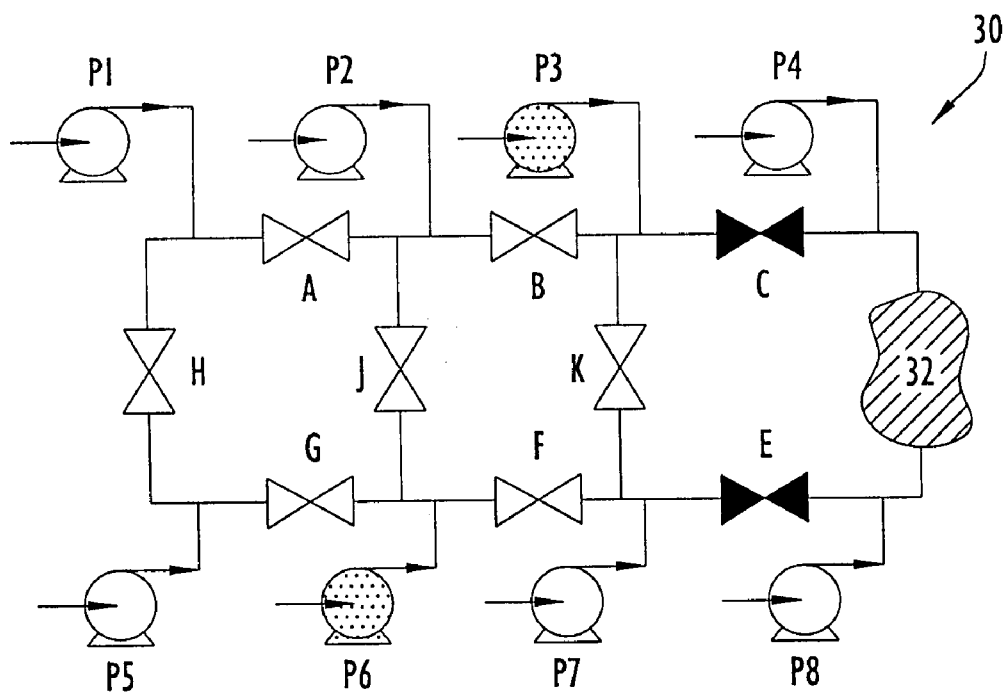

A diverted rupture path is established, as indicated in FIG. 6c, upon the closure of valves C and F (those valves are shaded to indicate closure). The flow direction is indicated as 38 and 39 in FIG. 6c. The diverted rupture path increases the flow rate at valves B, J and K above the set point such that a rupture condition is detected at those valves. Additionally, valve E still detects a rupture condition after closure of valves C and F. The $t_{rupture}$ and $\delta_{trigger}$ values for valves B, J and K are triggered (i.e., $\delta_{trigger}$ is set to 1 and the $t_{rupter}$ timer is initiated) at the time of detection of the diverted rupture path. Valves B, E, J and K are all marked accordingly in FIG. 6c in order to indicate that they are on the rupture path. Valves A, G and H are all still detecting a potential secondary rupture path.

Because $\delta_{second}=1$ for valves B, J and K, the time delay values based upon valve position will be different from those set forth in Table 9. Valve locations as well as $\tau_n$ closure times for valves B, J and K are set forth in Tables 10 and 11:

TABLE 10

| Valve | Flow Direction | $N_{valve}$ for Pump P3 | $N_{valve}$ for Pump P6 |
|---|---|---|---|
| B | Right | 3 | 1 |
| J | Up | 2 | 0 |
| K | Down | 0 | 2 |

TABLE 11

| $N_{valve}$ | $\tau_n$ (seconds) |
|---|---|
| 4 | 35 |
| 3 | 45 |
| 2 | 55 |
| 1 | 65 |
| 0 | 75 |

Based upon the information set forth in Tables 10 and 11, valve B would be the first valve to close, with respect to valves J and K, when its $t_{rupture}$ time is greater than 35 seconds and provided a rupture condition is still detected at such time.

Upon closure of valve E (see FIG. 6d, all closed valves are shaded), which is at 35 seconds after rupture 32 is first detected at valves C, E and F and 10 seconds after the closure of valves C and F is initiated, rupture 32 is isolated and normal pressures and flow rates are restored within the intact portions of system 30. None of the remaining open valves A, B, G, H, J and K detect a rupture condition at this point in time, so their $t_{rupture}$ clocks and $\delta_{trigger}$ and $\delta_{second}$ values are all reset to zero and the fluid flow characteristic for each of those valves is considered normal.

The pressure on both the inlet and outlet sides of valve F also increases above set point and the flow rate decreases below set point after valve E closes, such that valve F is no longer considered on the rupture path. Accordingly, valve F is reopened (see FIG. 6e) and its corresponding $t_{rupture}$ clock and $\delta_{trigger}$ value are reset to zero. In this example, the time for reopening valve F, or $t_{reopen}$, is zero, such that valve F will immediately begin to reopen upon detecting normal operating conditions. Under certain situations, it may be desirable to provide a delay for reopening a closed valve so as to ensure that conditions remain normal for a selected period of time prior to initiating the reopening of the valve.

The previous three examples illustrate how rupture path logic methods of the invention are capable of isolating piping system ruptures in any piping system configuration, including systems having one or more loops and/or branches and cross connecting portions. Piping systems to which the rupture path logic methods of the invention can be employed may also include any number or variety of valves. The valves may be smart valves, wherein each valve has its own processor that controls the valve based upon fluid characteristic information provided by sensors located in the proximity of the valve. Alternatively, valves maybe utilized in the invention that communicate with a central processor which controls each valve independently from the other valves. Processors utilized in the invention may be of any type capable of storing and analyzing measured and set point fluid characteristic information so as to control the valve accordingly.

The control logic employed by the invention provides for assessment of local conditions around each valve independent of communication with other valves to determine whether each valve is on a rupture path and should be closed. Such rupture path logic methods and corresponding systems are useful in effectively controlling valves to seal a rupture in the event that large portions of a piping system, including valves and sensors, are damaged.

The rupture path logic methods and systems of the invention are effective in closing valves closest to a rupture first to isolate the rupture, thereby eliminating the need to close additional valves further away from the rupture. Additionally, in situations where certain valves may close that are further in distance from a rupture than other valves, the invention provides for the reopening of those valves upon restoration of desired pressures and flow rates around those valves after the eventual isolation of the rupture and restoration of normal operating conditions within intact portions of the system.

Having thus described preferred embodiments of methods and apparatus for implementing rupture path logic, it is believed that other modifications, variations and changes will be suggested to those skilled in the art in view of the teachings set forth herein. It is therefore to be understood that all such variations, modifications and changes are believed to fall within the scope of the present invention as defined by the appended claims.

What is claimed is:

1. A method of detecting and isolating ruptures within a fluid piping system having at least one fluid supply source delivering fluid into and through said system and a plurality of open valves, said method comprising:

(a) continuously measuring a fluid characteristic at or near each valve;

(b) continuously detecting whether each valve within said system is on a rupture path within said system by comparing, for each valve, the fluid characteristic measured for the valve with a set point fluid characteristic for the valve;

(c) closing at least one valve detected in step (b) as being on said rupture path; and (d) allowing one or more of the valves not detected in step (b) as being on said rupture path to remain open.

2. The method of claim 1, wherein step (c) includes closing a plurality of valves detected as being on said rupture path in an order such that a valve detected as being on said rupture path and furthest from said at least one fluid supply source is closed prior to closure of a valve detected as being on said rupture path and closer to said at least one fluid supply source.

3. A method of detecting and isolating ruptures within a fluid piping system having at least one fluid supply source delivering fluid into and through said system and a plurality of open valves, said method comprising:

(a) measuring a fluid characteristic at or near each valve;

(b) detecting whether each valve is on a rupture path within said system by comparing, for each valve, the fluid characteristic measured for the valve with a set point fluid characteristic for the valve;

(c) closing at least one valve detected in step (b) as being on said rupture path and being further in distance from said at least one fluid supply source than all other valves detected in step (b) as being on said rupture path; and (d) repeating steps (a)–(c) until all valves detected in step (b) as being on said rupture path are closed in step (c) thereby isolating said rupture path within said system from said at least one fluid supply source.

4. The method of claim 3, wherein step (a) includes measuring a downstream pressure and a flow rate for each valve, and step (b) includes comparing, for each valve, the measured downstream pressure and flow rate for the valve with a set point pressure and a set point flow rate for the valve and detecting a valve as being on a rupture path when its measured downstream pressure is less than its set point pressure and its measured flow rate is greater than its set point flow rate.

5. The method of claim 3, wherein step (a) includes measuring a rupture resistance for each valve, and step (b) includes comparing, for each valve, the measured rupture resistance for the valve with a set point rupture resistance for the valve and detecting a valve as being on a rupture path when its rupture resistance is less than its set point rupture resistance.

6. The method of claim 3, wherein step (c) includes:

(c1) initiating a timer for said at least one valve detected as being on said rupture path that records a rupture time at which a rupture is first detected;

(c2) calculating a time delay for said at least one valve detected as being on said rupture path; and (c3) closing said at least one valve detected as being on said rupture path when said rupture time exceeds said time delay.

7. The method of claim 6, wherein step (c2) includes calculating a time delay that is proportional to a distance between said at least one valve and said at least one fluid supply source.

8. A method of detecting and isolating ruptures within a fluid piping system having at least one fluid supply source delivering fluid into and through said system and a plurality of open valves, said method comprising:
- (a) measuring a fluid characteristic at or near each valve;
- (b) detecting whether each valve is on a rupture path within said system based upon a comparison of said fluid characteristic measured at each valve with a set point fluid characteristic for each valve;
- (c) closing at least one valve detected in step (b) as being on said rupture path and being further in distance from said at least one fluid supply source than all other valves detected in step (b) as being on said rupture path; and
- (d) repeating steps (a)–(c) until all valves detected in step (b) as being on said rupture path are closed in step (c) thereby isolating said rupture path within said system from said at least one fluid supply source; wherein step (c) includes
  - (c1) initiating a timer for said at least one valve detected as being on said rupture path that records a rupture time at which a rupture is first detected;
  - (c2) calculating a time delay for said at least one valve detected as being on said rupture path, said step of calculating including calculating a time delay that is proportional to a distance between said at least one valve and said at least one fluid supply source, said step of calculating further including calculating said time delay as a function of a least number of valves in said system separating said at least one valve and said at least one fluid supply source, said step of calculating including determining said least number of valves by summing a total number of valves between said at least one valve and said at least one fluid supply source in a direction opposite a direction of fluid flow through said at least one valve; and
  - (c3) closing said at least one valve detected as being on said rupture path when said rupture time exceeds said time delay.

9. The method of claim 8, wherein step (a) includes:
- (a1) measuring an upstream pressure and a downstream pressure at or near said at least one valve so as to establish the direction of fluid flow through said at least one valve prior to step (c2).

10. The method of claim 3, further comprising, subsequent to step (c):
- (e) measuring a fluid characteristic at or near each closed valve;
- (f) detecting whether each closed valve within said system is still on said rupture path within said system by comparing, for each closed valve, the fluid characteristic measured at or near the closed valve with a set point fluid characteristic for the closed valve; and
- (g) opening at least one closed valve detected in step (f) as no longer being on said rupture path.

11. The method of claim 3, further comprising independently conducting steps (a)–(c) at each valve utilizing a processor of each valve.

12. The method of claim 11, further comprising:
- (e) providing set point fluid characteristic information to each processor from a remote master controller.

13. A method for controlling a valve in a fluid piping system having at least one fluid supply source delivering fluid into and through said system, said method comprising:
- (a) continuously measuring a fluid characteristic at or near said valve to obtain a value for the fluid characteristic;
- (b) continuously detecting whether said valve is on a rupture path within said system by comparing the value for the measured fluid characteristic with a set point value for the fluid characteristic for said valve; and
- (c) opening or closing said valve based upon a detection in step (b) of said valve being on said rupture path, wherein said valve closes or remains closed if said detection indicates that said valve is on said rupture path, and said valve opens or remains open if said detection does not indicate that said valve is on said rupture path.

14. The method of claim 13, wherein step (a) includes measuring a downstream pressure and a flow rate, and step (b) includes comparing the measured downstream pressure and flow rate with a set point pressure and a set point flow rate, and detecting said valve as being on said rupture path when said measured downstream pressure is less than said set point pressure and said measured flow rate is greater than said set point flow rate.

15. The method of claim 13, wherein step (a) includes measuring a rupture resistance, and step (b) includes comparing the measured rupture resistance with a set point rupture resistance and detecting said valve as being on said rupture path when said measured rupture resistance is less than said set point rupture resistance.

16. The method of claim 13, wherein step (b) includes:
- (b1) initiating a timer when said valve is detected as being on said rupture path that records a rupture time at which a rupture is first detected;

and step (c) includes:
- (c1) calculating a time delay for closing said valve when said valve is detected as being on said rupture path; and
- c2) closing said valve when said rupture time exceeds said time delay.

17. The method of claim 16, wherein step (c1) includes calculating a time delay that is proportional to a distance between said valve and said at least one fluid supply source.

18. A method for controlling a valve in a fluid piping system having at least one fluid supply source delivering fluid into and through said system, said method comprising:
- (a) continuously measuring a fluid characteristic at or near said valve;
- (b) continuously detecting whether said valve is on a rupture path within said system by comparing said measured fluid characteristic with a set point fluid characteristic for said valve; and
- (c) opening or closing said valve based upon a detection in step (b) of said valve being on said rupture path, wherein said valve closes or remains closed if said detection indicates that said valve is on said rupture path, and said valve opens or remains open if said detection does not indicate that said valve is on said rupture path; wherein step (b) includes:
  - (b1) initiating a timer when said valve is detected as being on said rupture path that records a rupture time at which a rupture is first detected; wherein step (c) includes:
  - (c1) calculating a time delay for closing said valve when said valve is detected as being on said rupture path, said step of calculating including calculating a time delay that is proportional to a distance between said valve and said at least one fluid supply source, wherein said system includes a plurality of valves and said step of calculating further includes calculating said time delay as a function of a least number of valves in said system separating said valve detected as being on said rupture path and said at least one fluid supply source, said step of calculating including determining said least number of valves by summing a total number of valves between said valve detected as being on said rupture path and said at least one fluid supply source in a direction opposite a direction of fluid flow through said valve detected as being on said rupture path; and (c2) closing said valve when said rupture time exceeds said time delay.

19. The method of claim 18, wherein step (a) includes:

(a1) measuring an upstream pressure and a downstream pressure at or near said valve detected as being on said rupture path so as to establish the direction of fluid flow through said valve detected as being on said rupture path prior to calculating said time delay in step (c1).

20. The method of claim 13, wherein steps (a)–(c) are performed using a processor of said valve that stores set point fluid characteristic information for said valve.

21. The method of claim 20, further comprising:

(e) providing said set point fluid characteristic information to said processor from a remote master controller.

22. A fluid piping system capable of automatic detection and isolation of ruptures, said system comprising:

at least one fluid supply source delivering fluid into and through said system; and at least one valve including a valve inlet, a valve outlet, a first pressure sensor at or near said valve inlet, a second pressure sensor at or near said valve outlet, an actuator configured to automatically open and close said at least one valve, and a processor in communication with said pressure sensors; wherein said processor is configured to measure a fluid characteristic at or near said at least one valve based upon pressure values measured by said pressure sensors, to detect whether said at least one valve is on a rupture path within said system by comparing the measured fluid characteristic with a set point fluid characteristic, and to open or close said at least one valve via said actuator based upon a determination by said processor as to whether said at least one valve is on said rupture path.

23. The system of claim 22, wherein said system includes a plurality of said valves having corresponding processors configured to respectively open or close said valves independent of all other of said valves in said system.

24. The system of claim 22, wherein said processor includes a timer that is configured to activate and record a rupture time upon the determination that said at least one valve is on said rupture path, and said processor is configured to close said at least one valve when said rupture time for said at least one valve exceeds a predetermined time delay for said at least one valve.

25. The system of claim 24, wherein said predetermined time delay for said at least one valve is proportional to a distance between said at least one valve and said at least one fluid supply source, such that said time delay decreases as the distance between said at least one valve and said at least one fluid supply source increases.

26. The system of claim 22, wherein said at least one valve includes a flow rate sensor at or near said valve inlet or said valve outlet, and said processor is further configured to obtain flow rate measurements from said flow rate sensor.

27. The system of claim 22, wherein said processor is further configured to store set point fluid characteristic information for said at least one valve, and said processor includes a transceiver configured to receive set point fluid characteristic information from a remote master controller and to communicate with said at least one fluid supply source.

* * * * *